US007893811B2

(12) United States Patent
Augustyniak et al.

(10) Patent No.: US 7,893,811 B2
(45) Date of Patent: Feb. 22, 2011

(54) METHOD FOR AUTOMATICALLY ASCERTAINING THE NUMBER OF PEOPLE AND/OR OBJECTS PRESENT IN A GATE

(75) Inventors: Matthias Augustyniak, Mönchengladbach (DE); Oliver Hörkens, Mönchengladbach (DE)

(73) Assignee: Scheidt & Bachmann GmbH (DE)

( * ) Notice: Subject to any disclaimer, the term of this patent is extended or adjusted under 35 U.S.C. 154(b) by 251 days.

(21) Appl. No.: 11/989,786

(22) PCT Filed: Aug. 1, 2006

(86) PCT No.: PCT/EP2006/007605

§ 371 (c)(1), (2), (4) Date: May 30, 2008

(87) PCT Pub. No.: WO2007/014753

PCT Pub. Date: Feb. 8, 2007

(65) Prior Publication Data

US 2008/0308322 A1 Dec. 18, 2008

(30) Foreign Application Priority Data

Aug. 1, 2005 (DE) ...................... 10 2005 036 572

(51) Int. Cl.
*E05G 5/00* (2006.01)
*G07C 9/02* (2006.01)
*G01G 19/00* (2006.01)

(52) U.S. Cl. ...................... 340/5.52; 340/5.7; 340/543; 340/666; 177/25.13; 177/25.17

(58) Field of Classification Search ................. 340/666, 340/5.52, 5.7, 543; 177/25.11–25.14, 25.17
See application file for complete search history.

(56) References Cited

U.S. PATENT DOCUMENTS 4,139,070 A * 2/1979 Hanson et al. ............. 177/200

(Continued)

FOREIGN PATENT DOCUMENTS

DE 36 23 792 C1 12/1987

(Continued)

OTHER PUBLICATIONS

International Search Report for PCT/EP2006/007605, dated Nov. 15, 2006 (in English and German).

(Continued)

*Primary Examiner*—Randy W Gibson
(74) *Attorney, Agent, or Firm*—Harness, Dickey & Pierce, P.L.C.

(57) ABSTRACT

Method for automatically ascertaining the number of people and/or objects present in a gate (10; 50; 70) which has the following steps: detection of weight data for people and/or objects moving in the gate (10; 50; 70) by means of a plurality of weight sensors (18, 20, 22, 24) integrated in the floor of the gate (10; 50; 70) and evaluation of the detected weight data in order to ascertain the number of people/objects from their maximum values and from their dynamics and/or the number of detected centers of gravity and/or the position of the weight sensors (18, 20, 22, 24) which have detected the weight data, and/or the order in which the weight sensors (18, 20, 22, 24) have detected the weight data.

9 Claims, 4 Drawing Sheets

U.S. PATENT DOCUMENTS

Figure 1:
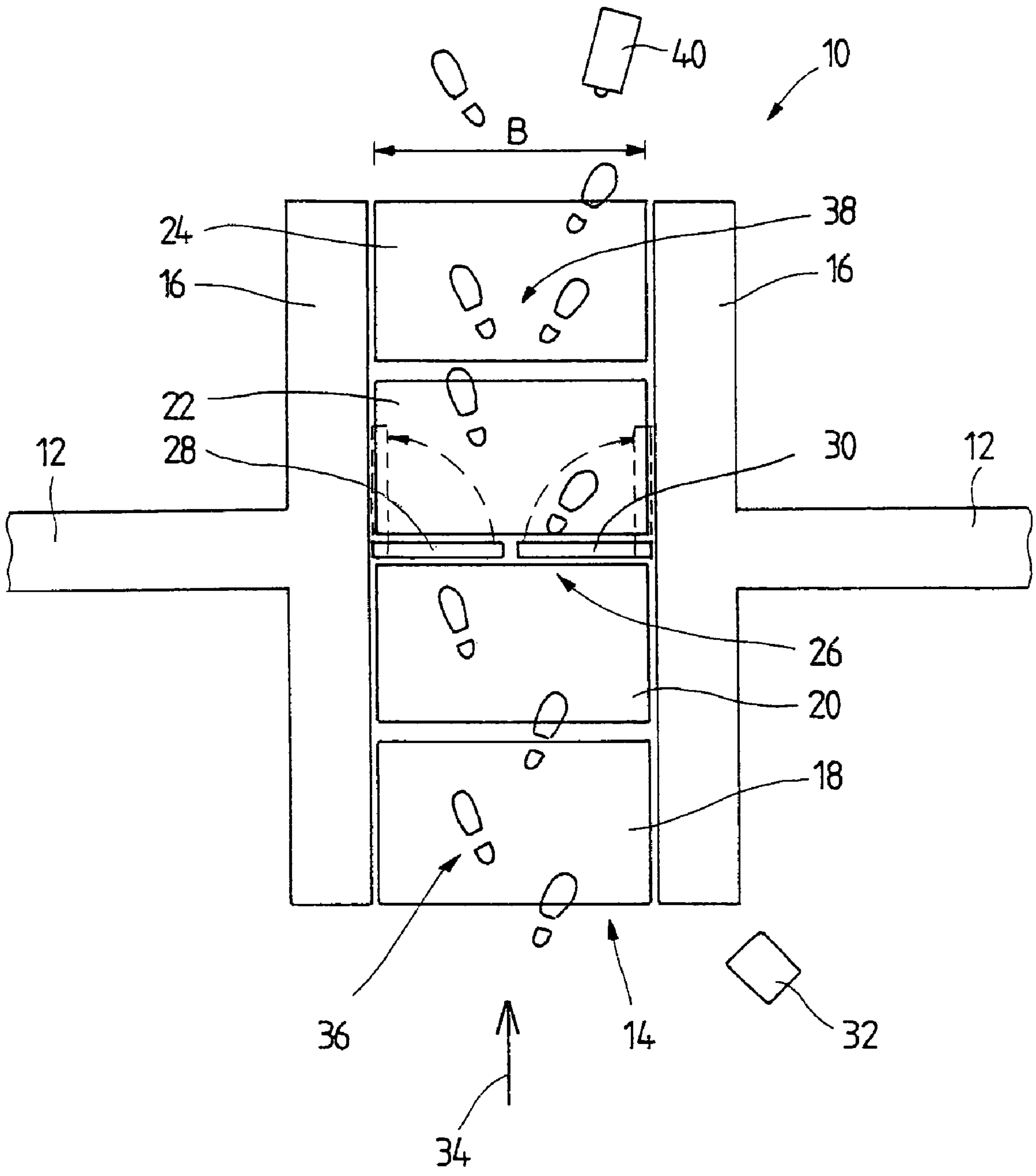

| | | | | |
|---|---|---|---|---|
| 4,847,485 | A | 7/1989 | Koelsch et al. | |
| 4,888,581 | A * | 12/1989 | Guscott | 340/666 |
| 4,973,949 | A * | 11/1990 | Brocia | 340/666 |
| 5,199,517 | A * | 4/1993 | Kirby | 177/25.17 |
| 5,268,670 | A * | 12/1993 | Brasch et al. | 340/541 |
| 5,400,722 | A * | 3/1995 | Moses et al. | 109/2 |
| 5,449,864 | A * | 9/1995 | Beatty et al. | 177/25.14 |
| RE37,467 | E * | 12/2001 | Brasch et al. | 340/541 |
| 6,611,195 | B1 * | 8/2003 | Manneschi et al. | 340/5.52 |
| 7,012,210 | B2 * | 3/2006 | Kibbler et al. | 209/583 |
| 7,129,423 | B2 * | 10/2006 | Baarsch et al. | 177/25.13 |
| 7,239,724 | B2 * | 7/2007 | Sznba | 382/115 |
| 7,406,927 | B2 * | 8/2008 | Baarsch et al. | 119/842 |
| 7,586,049 | B2 * | 9/2009 | Wurz | 177/25.13 |
| 2004/0021552 | A1 * | 2/2004 | Koo | 340/5.53 |
| 2006/0273897 | A1 * | 12/2006 | Risi | 340/540 |

FOREIGN PATENT DOCUMENTS

| | | | |
|---|---|---|---|
| DE | 39 04 840 | C1 | 1/1990 |
| DE | 3904840 | | 1/1990 |
| DE | 197 43 437 | A1 | 4/1998 |
| DE | 101 63 123 | A1 | 7/2003 |
| DE | 203 16 067 | U1 | 4/2004 |
| EP | 0 622 761 | A2 | 11/1994 |
| EP | 0622761 | | 11/1994 |
| EP | 1 496 186 | A1 | 1/2005 |
| JP | 03-196286 | A | 8/1991 |
| JP | 05-324955 | A | 12/1993 |

OTHER PUBLICATIONS

International Preliminary Report on Patentability for PCT/EP2006/007605 dated Mar. 26, 2008.

* cited by examiner

METHOD FOR AUTOMATICALLY ASCERTAINING THE NUMBER OF PEOPLE AND/OR OBJECTS PRESENT IN A GATE

The present invention relates to a method for automatically ascertaining the number of people and/or objects present in a gate. The invention also relates to a corresponding gate.

In accordance with the present invention, the term "gate" is used as a collective term for passenger access control systems which monitor or control the access of persons to a predetermined area. Such a gate may be for instance a hip-high or head-high revolving door or a device equipped with rotating barrier arms, which door or device limit the number of passengers that are allowed to pass the gate at the same time. Further, such a gate may be a transit area into which doors are swung horizontally or vertically or are inserted laterally, or also a passenger lock including a gate room that is defined by an entrance and an exit, wherein a person who is present in the gate room is allowed to pass through the exit only while the entrance is closed, whereby an individualisation of persons takes place.

In some cases of use of such gates it is desirable to limit the number of persons who are allowed to pass the gate at the same time to a predetermined permissible number of persons. This is the case, for example, when the passage of a gate is reserved to persons having a corresponding access authorisation. To make sure that the gate is passed exclusively by persons having a valid access authorisation, the number of the persons present in a gate must be correspondingly ascertained and compared to the number of valid access authorisations, both the ascertaining and comparison being performed preferably automatically. It shall be avoided in this way that unauthorized persons are smuggled in.

For automatically ascertaining the number of persons and/or objects present in a gate various methods are known.

The document DE-PS-169273 discloses for instance a passenger gate which has two doors and which has a weight sensor integrated in its floor. By detecting the actual weight of a person present in the passenger gate with the assistance of the weight sensor and by a comparison with a known, individual nominal weight of the person passing the gate, it can be ascertained whether one person or more than one person is or are present in the passenger gate. A drawback of this method resides in the fact that the individual nominal weight of the person passing the gate must be known in advance, in order to be able to make a corresponding comparison. In addition to that, the detected weight may largely deviate from the individual nominal weight of the person passing, if he or she carries correspondingly heavy luggage. In such a case, the passage of the gate would be denied, though the person has a valid authorisation.

From the document DE-PS-36 23 792 there is known an installation for ascertaining the number of persons and their direction of movement inside a room to be monitored or inside a gate, for the purpose of individualisation, in which infrared sensors which are disposed in a special way detect the change in the ambient temperature caused by the body heat of the passing persons. A disadvantage of this method is the dependency of the sensor output signal on the velocity of the passing persons, for which reason this method is not suited for the individualisation of persons by means of a gate where the person has to wait in at least until the first door is closed or until the identification for instance through biometric data is concluded.

It is therefore an object of the present invention to provide an improved method for automatically ascertaining the number of people and/or objects present in a gate as well as a correspondingly improved gate.

In accordance with the present invention, this object is solved by a method according to claim 1 and by a gate according to the claims 4-5. The dependent claims are related to individual embodiments of the method or of the gate in accordance with the invention.

In the inventive method for automatically ascertaining the number of people and/or objects present in a gate, weight data of the persons and/or objects moving in the gate are detected by means of a plurality, at least two, weight sensors integrated in the floor of the gate. These weight data are evaluated by means of a computer-assisted weight data evaluation unit in real time, in order to ascertain the number of persons and/or objects present in the gate. The evaluation is performed on the basis of the detected maximum values on one side, i.e. on the basis of the detected actual weight of the persons and/or objects present in the gate. On the other side, in accordance with the present invention, a further parameter contributes to the evaluation, which parameter is also inferred from the detected weight data. This further parameter is concerned with the dynamics of the weight data and/or with the number of the detected centres of gravity and/or with the position of the weight sensors that have detected said weight data and/or with the order in which the weight sensors have detected the weight data.

When a person is walking across weight sensors which are integrated in the floor area of a gate and when weight data are continuously detected by means of the weight sensors during this time, the weight data recorded in a time-weight graph result in a substantially wave-like function, due to the person equally shifting her weight from one foot to the other during walking. A respective maximum is produced the moment in which the total weight of the person is resting on one foot. This maximum corresponds to the actual weight of the person and will be referred to in the present description as the "maximum value" of the detected weight data. The maximum value is detected by the sensors also when the person stops walking. In this case, the weight data recorded in a time-weight graph will result in a straight line parallel to the axis of time. This maximum value constitutes a parameter which is used in the evaluation of the detected weight data for ascertaining the number of persons/objects.

According to the present invention, the term "dynamics" is understood to mean the change of the weight data over the time, which will be described in more detail in the following.

In the case of a not moving person or a not moving object, the weight data do not change, since the same weight sensors always detect the same weight data. Therefore, the result is a straight line parallel to the axis of time in a time-weight graph, which straight line is composed of weight data that have been detected by the same weight sensors. Such a straight line allows conclusions to be drawn to a not moving person or to a not moving object.

If a person or an animal are walking, the weight data will change as previously described, due to the constant shifting of weight in a substantially regular rhythm. During this, the weight data are always detected by different weight sensors, because of the person or animal moving from one weight sensor to the next. Such periodical changes which are always detected by different weight sensors accordingly allow conclusions to be drawn to the fact that an individual is moving in the gate.

If, for instance, a person moving in the gate is pulling a trolley, the weight sensors will detect the periodically changing weight data of the person on one side and the weight data of the trolley on the other side. Since the weight of the trolley is continuously transmitted to the weight sensors through the trolley rolls, the weight data recorded in a time-weight graph similarly result in a straight line parallel to the axis of time, as in the example of the not moving person. But contrary to the not moving person, the weight data are not detected by only one weight sensor but by several weight sensors, due to the movement of the suitcase. A straight line in the time-weight graph, which straight line is composed of weight data from several weight sensors, allows conclusions to be drawn to the fact that an object is moved across the gate floor.

It may be specified in this way on the basis of the dynamics of the detected weight data whether a person or object are present in the gate.

In addition to the dynamics also the number of the detected centres of gravity may contribute to the evaluation. Here, the number of the detected centres of gravity corresponds to the number of persons and/or objects present in the gate.

If in the evaluation the positions of the individual weight sensors are taken into account, the persons and/or objects present in the gate may be accurately localised.

If as a parameter the order in which the weight sensors have detected the weight data is taken into account, also the direction in which the persons or objects move may be determined.

The method according to the invention can reliably determine the number of persons and/or objects present in a gate. It can be prevented in this way that persons are smuggled into the gate inadmissibly.

According to the invention, further sensors such as for instance contact mats, light barriers, cameras or the like may be used in addition to the weight sensors, for detecting the number of persons/objects.

Moreover, the automatic opening and closing of a door which is provided in the gate is preferably also controlled on the basis of the weight data that are detected by means of the weight sensors.

The present invention also provides for a gate having weight sensors integrated in a floor area of the gate and including a weight data evaluation unit which is adapted in a way such that the number of persons and/or objects present in a gate may be detected automatically by means of an evaluation of weight data that have been detected by the weight sensors from their maximum values and from their dynamics and/or the number of the detected centres of gravity and/or the position of the weight sensors that have detected the weight data. Such a gate may be used for carrying out the method according to the invention. Preferably, the gate comprises in addition to the weight sensors still further sensors such as for instance contact mats, light barriers, cameras or the like.

Figure 2:
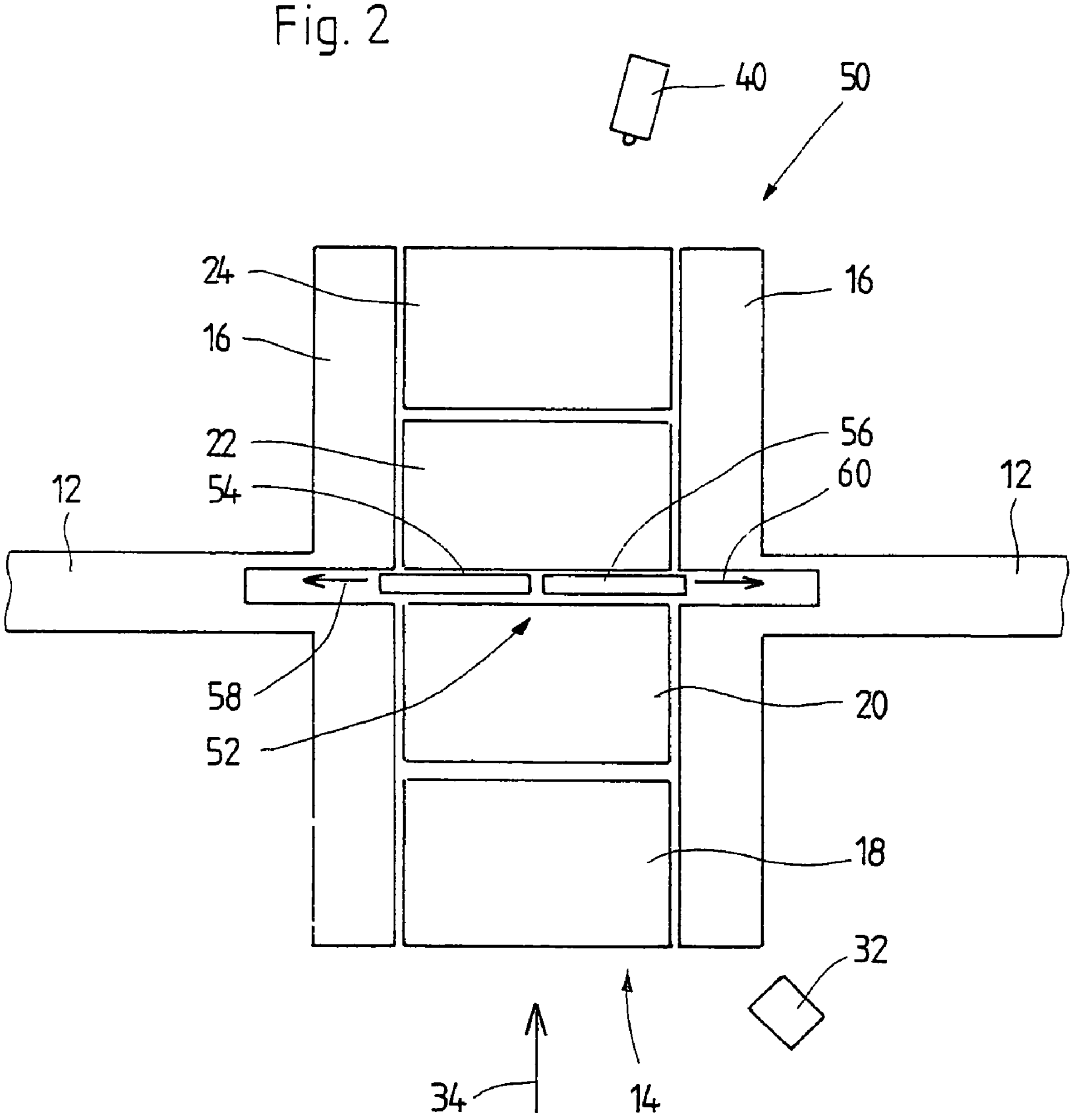
Figure 3:
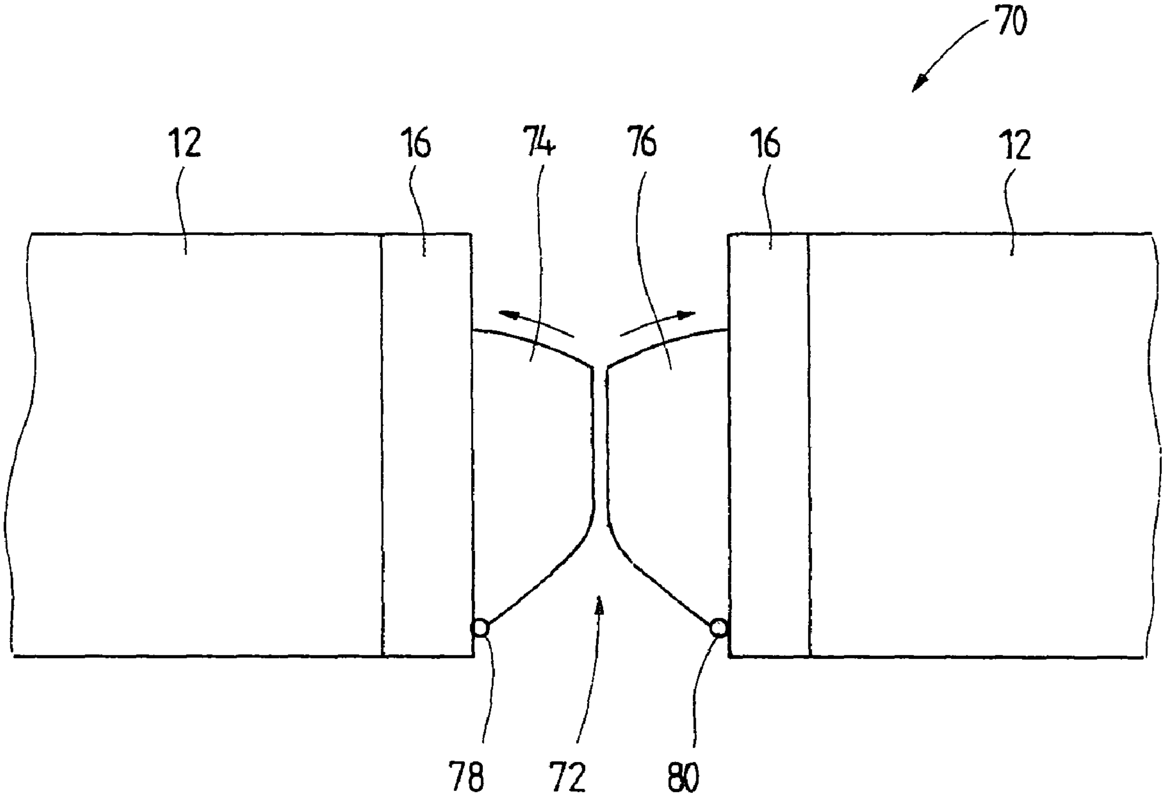
Figure 4:
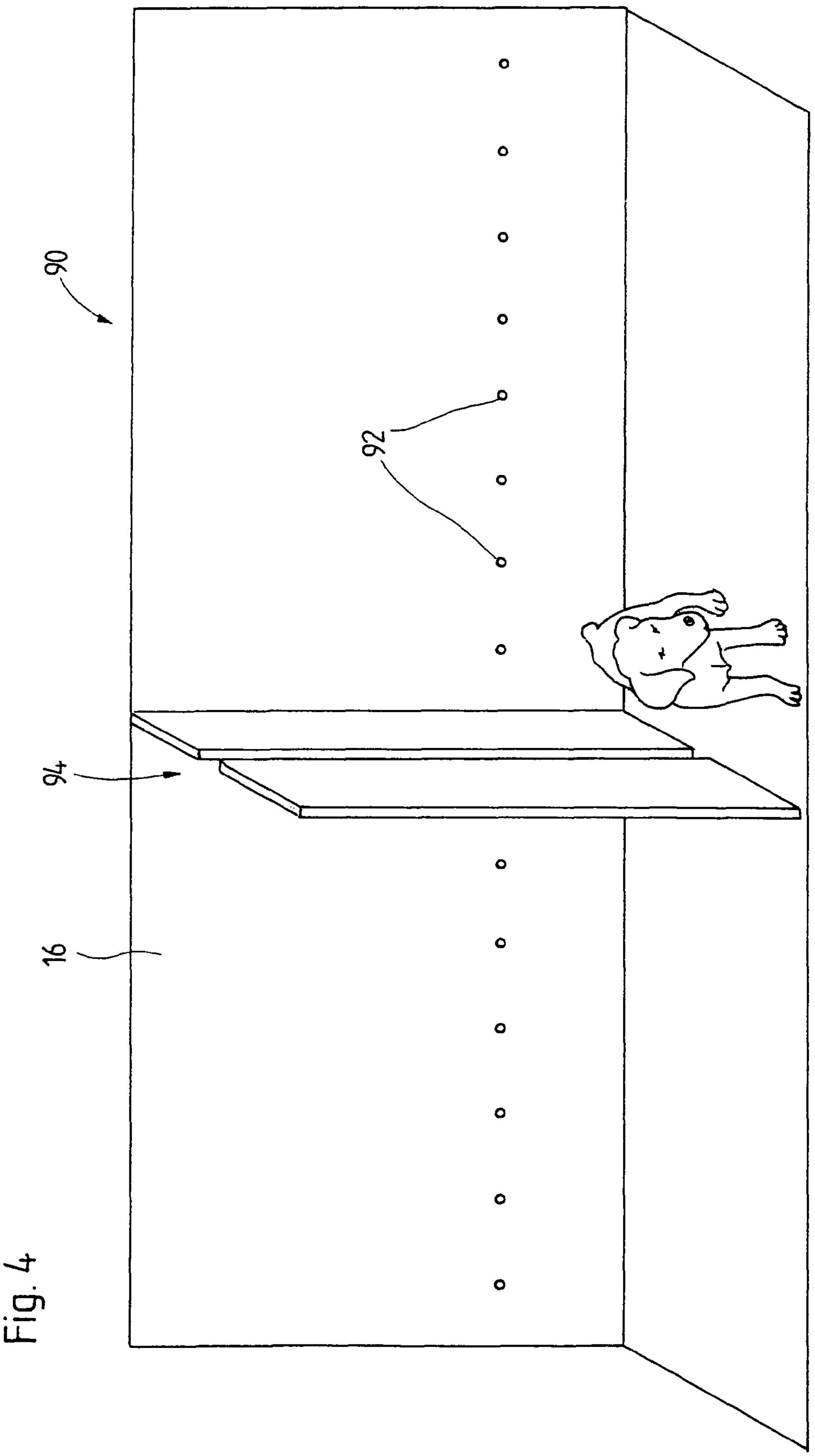

The present invention will now be described in more detail by way of exemplary embodiments and with reference to the attached drawings, wherein it is shown by:

FIG. 1 a top view of a first exemplary embodiment of the gate in accordance with the invention;

FIG. 2 a top view of a second exemplary embodiment of the gate in accordance with the invention;

FIG. 3 a front view of third exemplary embodiment of the gate in accordance with the invention; and FIG. 4 a side view of a conventional gate.

In the following description similar reference numbers denote similar components.

FIG. 1 illustrates a first exemplary embodiment of a gate 10 in accordance with the invention. The gate 10 includes a passage way 14 which extends through a wall 12 and which is laterally limited by two side walls 16. The passage way 14 has a width B which is dimensioned such that the gate 10 may be easily passed only by one person after the other. Along said passage way 14 four weight sensors 18, 20, 22 and 24 are successively arranged in a row, which weight sensors are integrated in the floor of the gate and include rectangular, tile-shaped weight receiving areas. The weight sensors 18, 20, 22 and 24 are adapted for continuously detecting weight data which are transmitted to a weight data evaluation unit (not further illustrated), for weight data evaluation. In the middle of said passage way 14, hence between the weight sensors 20 and 22, a head-high swing door 26 is provided which includes two swinging door wings 28 and 30, each of which being adapted for pivoting about a pivot axis respectively provided on the side walls, as it is indicated by the dashed arrows in FIG. 1. Before the passage way 14 a passage authorisation control device 32 is provided, by means of which passage authorisations issued to authorized persons are checked for their validity.

Now, if a person desires to pass the gate 10 in the direction of arrow 34, she first has her passage authorisation checked for validity in the passage authorisation control device 32. The passage authorisation is preferably stored on an automatically readable data carrier, such as a transponder, a magnetic card or the like, which is read by the passage authorisation control device 32. If the check results in that the passage authorisation is valid, the swing door 26 will open automatically by their door wings 28 and 30 being moved about their pivoting axes in the direction of the dashed arrows. The opening swing door 26 indicates to the person that she is now supposed to pass the passage way 14.

To avoid that several persons pass the passage way 14 with only a single passage authorisation, the weight sensors 18, 20, 22 and 24 integrated in the floor of the gate 10 continuously record weight data from the person(s) moving through the passage way 14, in order to detect their number and to compare the detected number of persons with the number of valid passage authorisations. It shall be found out in this way whether persons are smuggled in inadmissibly.

When entering the passage way 14, the weight sensor 18 is loaded first, as it is indicated by the foot prints 36 shown in FIG. 1. As the person is moving, continuous weight data are detected as described above, first by the first weight sensor 18 and then by the second weight sensor 20, which weight data that are recorded in a time-weight graph result in a substantially wave-like function, due to the load changing from one foot to the other, which shows that the gate 10 is presently passed by an individual. On the basis of the characteristic of the wave shape it is possible to differentiate between a human being and an animal. Further, the detected maximum values allow conclusions to be drawn to the height of the human being. If for instance a human being with an actual weight of 30 kg is detected, this human being is likely to be a child. A person having an actual weight of 80 kg is likely to be full-grown.

After the second weight sensor 20 the person passes the opened swing door 26 and steps onto the third weight sensor 22. In the presently shown example, the persons stops on the fourth weight sensor 24, as it is indicated by two parallel foot prints 38 in FIG. 1. Correspondingly, the non-illustrated weight data evaluation unit receives weight data exclusively from the fourth weight sensor 24, which data—when recorded in a time-weight graph—result in a straight line parallel to the axis of time. Such weight data which are received after the passage of the swing door 26 may indicate for example that a person has changed her mind and desires to return. Correspondingly, the swing door 26 remains open, so that the person is granted this option. Now, if the third weight sensor 22 again detects weight data, the person has in fact changed her mind. Therefore, the swing door 26 is closed again only after the person has passed the second weight sensor 20. On the other hand, if the fourth weight sensor 24 detects that the person continues moving towards the exit, the swing door 26 closes automatically, as soon as the person has left the passage way 14, hence as soon as none of the weight sensors 18, 20, 22 and 24 detects weight data greater than the value of zero.

Now, if more than one person enter the passage way 14 either at the same time or one after the other, this fact is detected by the weight sensors 18, 20, 22 and 24, because by two moving persons several wave-like functions are produced in the time-weight graph which occur one after the other or which overlap each other. If this is the case, the swing door 26 is closed without delay, because it has to be assumed that an additional person is intended to be smuggled in inadmissibly.

Two persons are also differentiated from one person who carries a piece of luggage such as a trolley, likewise on the basis of the evaluation of the weight data detected by means of the weight sensors 18, 20, 22 and 24. In contrary to a walking person, a moving trolley produces a linear function in the time-weight graph, since any weight shift does not take place and the weight instead bears on and is equally distributed to the suitcase rolls.

A further option for ascertaining the number of persons or objects present in the passage way 14 resides in that fact that the number of centres of gravity is determined on the basis of the weight data which have been detected by means of the weight sensors 18, 20, 22 and 24. Here, the number of the centres of gravity corresponds to the number of persons/objects.

In the event that the weight data detected by means of the weight sensors 18, 20, 22 and 24 produce a data pattern which cannot be evaluated by the weight data evaluation unit, image data which are collected by means of camera 40 which is focussed on the passage way 14 are used for instance as an alternative for ascertaining the number of persons.

FIG. 2 shows a top view of a second embodiment of a gate 50 in accordance with the present invention. The structure of the gate 50 essentially corresponds to that of the gate 10 shown in FIG. 1. The swing door 26, however, is replaced by a two-part sliding door 52, of which both door halves 54 and 56 are correspondingly movable for automatic opening and closing in the direction of the arrows 58 and 60.

FIG. 3 shows a side view of a third embodiment of a gate 70 in accordance with the present invention, of which the structure also essentially corresponds to that of the gate 10 shown in FIG. 1. The gate 70 includes a swing door 72, of which both door wings 74 and 76 are adapted for pivoting about the corresponding pivot axes 78 and 80 laterally upwardly in the direction of the respective side walls 16, for automatically opening and closing.

FIG. 4 is a side view of a conventional gate 90, of which the structure essentially corresponds to that of the gate 10 shown in FIG. 1. But instead of the weight sensors several light barriers 92 are provided which are arranged one after the other on the side walls 16 in the passage direction. These light barriers 92 serve for detecting persons and/or objects present in the gate 90. A drawback of such light barriers 92 resides in the fact that it is normally possible to avoid them by avoiding that the light rays emitted from the light barriers 92 cross each other. To prevent this, a large number of light barriers must be provided which is very expensive.

In addition to that, such light barriers 92 are unable to differentiate between a human being and an animal nor between a creature and an object. If the light barriers 92 are positioned too high, the risk that especially small children or animals, e.g. dogs, are not detected continues to exist. For example, if a person takes a child by its hand or has a dog following her on a leash, it cannot be excluded that that door 94 will be closed between the person and the child or the dog or that the child or the dog become trapped by the door 94.

These drawbacks are removed by a gate in accordance with the present invention including weight sensors, if necessary combined with additional sensors, and by the method in accordance with the present invention, because it is possible to specify persons and/or objects present in the gate and to detect their number.

It should be understood that the embodiments which have been described with reference to the drawings are not limiting and that changes and modifications may be made, without departing from the scope of protection of the present invention which is defined by the attached claims.

The invention claimed is:

1. A method for automatically ascertaining the number of people or objects present in a gate, the method having the following steps:

providing a gate having a door and a passage way, the door including one of a revolving door or a device equipped with rotating barrier arms;

providing a plurality of weight sensors along said passage way, wherein the weight sensors are arranged at both sides of the door;

detecting of weight data by the plurality of weight sensors;

evaluating the detected weight data in order to ascertain the number of people or objects inside the passage way, wherein evaluating comprises ascertaining the number of people or objects by at least one of maximum values, dynamics, a number of detected centers of gravity, a position of the weight sensors which have detected certain weight data, and an order in which the weight sensors have detected the weight data; and automatically closing the door, wherein closing is controlled based on the weight data detected by the plurality of weight sensors.

2. The method according to claim 1, wherein, in addition to the weight sensors, additional sensors for the detection of the number of people or objects are used.

3. The method according to claim 2, wherein the automatic opening and closing of the door present in the gate is controlled on the basis of the detected weight data and the data from the additional sensors.

4. The method according to claim 1, wherein ascertaining the number of persons or objects inside the passageway includes ascertaining the number of persons or objects passing the gate, which is performed on the basis of the detected weight data and the data from the additional sensors.

5. A gate automatically ascertaining the number of people or objects present in the gate, including:

a passage way;

a door arranged at the passage way, wherein the door includes one of a revolving door and a device equipped with rotating barrier arms;

a plurality of weight sensors along said passage way, wherein the weight sensors are arranged at both sides of the door;

a weight data evaluation unit which is configured in such a way that the number and position of people or objects present in the passage way can be determined automatically through evaluating weight data which have been detected by means of the weight sensors from at least one of their maximum values, absolute values, dynamics of the maximum or absolute values, a number of the detected centers of gravity, a position of the weight sensors which have detected certain weight data, and an order in which the weight sensors have detected the weight data; and means for automatically opening and closing the door, wherein the means is controlled by the weight data evaluation unit.

6. The gate according to claim 5, including additional sensors for detecting the number of persons or objects and the position of the persons or objects in the passage way.

7. The gate according to claim 5, wherein the weight data evaluation unit is configured to determine if one of the people present in the passage way has passed beyond the door towards an exit of the passage way by means of the weight sensors positioned on both sides of the door and, if so, determine if that person is stationary after passing beyond the door while remaining in the passage way.

8. The gate according to claim 7, further comprising the weight data evaluation unit being configured to:

maintain the door in an open position if it is determined that the person remaining in the passage way after passing beyond the door is stationary;

close the door if it is determined that the person starts to move towards the exit of the passage way, the exit being on an opposite side of the door as an entrance to the passage way; and continue to maintain the door in the open position if it is determined that the person starts to move back towards the door, and close the door after the person has passed through the door towards the entrance of the passage way.

9. The method according to claim 1, further comprising:

determining if one of the people ascertained to be in the passage way have passed beyond the door in a direction from an entrance of the passage way towards an exit of the passage way based on the evaluating of the detected weight data using the weight sensors on both sides of the door;

determining if that person is stationary after passing beyond the door while remaining in the passage way;

maintaining the door in an open position while that person remains stationary;

closing the door if it is determined that the person starts to move towards the exit; and continuing to maintain the door in the open position if it is determined that the person starts to move back towards the entrance, and closing the door once the person passes through the door in a direction towards the entrance of the passage way.

* * * * *